April 2, 1929. W. R. LITTLE 1,707,559
FLOWERPOT
Filed Oct. 15, 1927

Inventor
W. R. Little
By Watson E. Coleman
Attorney

Patented Apr. 2, 1929.

1,707,559

UNITED STATES PATENT OFFICE.

WILBER R. LITTLE, OF IOWA FALLS, IOWA.

FLOWERPOT.

Application filed October 15, 1927. Serial No. 226,448.

This invention relates to flower pots and more particularly to the improvement shown in my prior Patent No. 1,157,712, granted October 20, 1925, for flower pots.

An important object of the invention is to provide a flower pot and drip bowl construction such that the flower pot serves to completely conceal the dripping bowl and further serves to prevent the entrance of dust or dirt thereto.

A further object of the invention is to provide a construction such that the pot and drip bowl may either be lifted as a unit when the pot is lifted or left upon the support when the pot is lifted, as desired by the handler.

A still further object of the invention is to provide a device of this character which may be readily and cheaply produced and which will be durable and efficient in service.

These and other objects I attain by the construction shown in the accompanying drawing, wherein for the purpose of illustration is shown a preferred embodiment of my invention and wherein:—

Figure 1:
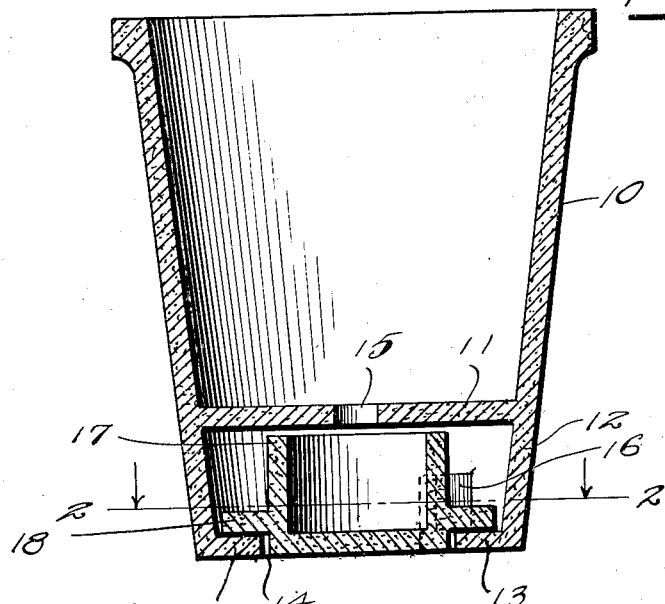
Figure 1 is a vertical sectional view through a flower pot constructed in accordance with my invention.
Figure 2:
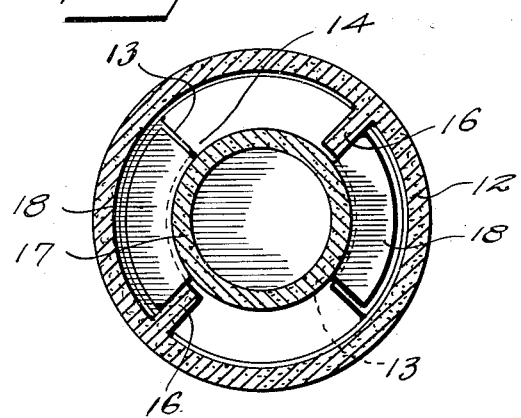
Figure 2 is a section on the line 2—2 of Figure 1, the parts being shown in the position which they occupy when the pot and bowl are connected for simultaneous elevation.
Figure 3:
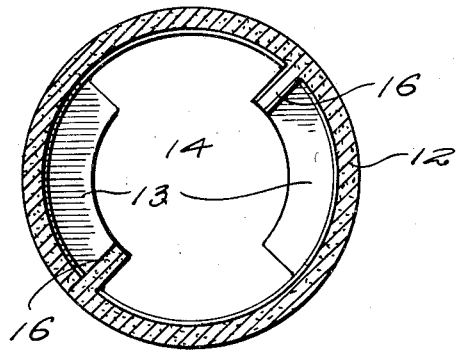
Figure 3 is a similar section with the bowl being removed.
Figure 4:
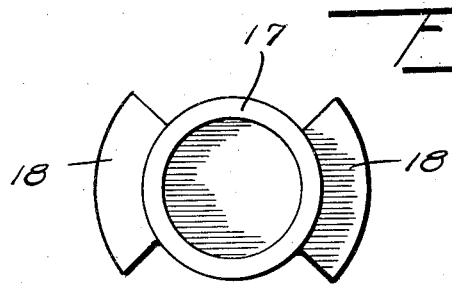
Figure 4 is a plan view of the bowl removed.

Referring now more particularly to the drawing, the numeral 10 generally designates a flower pot similar to the ordinary flower pot, with the exception of the fact that beneath the bottom 11 of the pot, the side walls are extended downwardly to form a flange 12 upon which the pot actually seats. These flanges are in turn provided with substantially quarter segmental inwardly directed locking lugs 13, which extend inwardly and are relatively narrow, so that they leave a relatively large central opening 14 co-axial with the drain opening 15 of the bottom 11. Extending upwardly upon the inner faces of the flanges 12 are ribs 16, these ribs extending from corresponding ends of the lugs 13 and acting as stops, as will hereinafter more fully appear.

The drip bowl 17 is of slightly less diameter than the opening 14 and of such depth that it may be accommodated beneath the bottom 11 of the pot. This drip bowl has projecting outwardly from its side wall diametrically opposed substantially quarter segmental lugs 18. These lugs 18 may be entered between the lugs 13 of the bowl and properly aligned with the spaces therebetween and the pot may be seated about the bowl upon the support. By rotating the pot after engagement to place the lugs 18 over the lugs 13, when the pot is elevated the bowl will be likewise elevated. The ribs 16 serve as stops both in aligning the lugs 18 for passage between adjacent edges of the lugs 13 and to overlie the same. It will be obvious that when the lugs 18 are in engagement with one side of their coacting ribs 16, they will overlie the lug 13 and when in engagement with the opposite side of the other rib, will overlie the space between adjacent edges of the lugs 13. While the lugs 13 and 18 are disclosed as disposed in particular locations upon their associated elements, it will, of course, be understood that these lugs might be disposed at any point upon the flange 12 and wall of the bowl 17, as desired. The position which these lugs actually occupy will be determined by relative cost of manufacture.

It will, of course, be obvious that certain changes in the construction can be resorted to without in any manner departing from the spirit of my invention and I accordingly do not limit myself to such specific structure except as hereinafter claimed.

I claim:—

1. In combination, a flower pot having the usual centrally located opening in its bottom and means upon the pot maintaining said bottom in spaced relation to a support upon which the pot is placed, a drip bowl positionable beneath the bottom of the pot and concealed by said means, said means and the bowl having coacting elements disengageable from one another by a predetermined relative rotation and supporting the bowl upon elevation of the pot only after a predetermined elevation of the pot.

2. In combination with a flower pot having the usual centrally located outlet opening in its bottom, a circular flange upon the pot maintaining said bottom in spaced relation to a support upon which the pot is placed and a drip bowl positionable beneath the bottom and within the flange, the flange of the pot having inwardly directed lugs, the drip bowl having outwardly directed lugs positionable over the lugs of the flange to permit simultaneous elevation of the pot and bowl, the flange having stops with which the lugs of the bowl may be engaged by rotation of the pot to align the lugs of the bowl with the lugs of the flange or to align the lugs of the bowl with the space between the lugs of the flange.

In testimony whereof I hereunto affix my signature.

WILBER R. LITTLE.